United States Patent
Lee et al.

(10) Patent No.: US 8,162,351 B2
(45) Date of Patent: Apr. 24, 2012

(54) SMALL MOBILE ROBOT WITH BUILT-IN AUXILIARY WHEEL FOR OVERCOMING TOPOGRAPHY

(75) Inventors: So-Young Lee, Daegu (KR); Jeong-Ho Kang, Daegu (KR); Min-Kyu Kim, Daegu (KR)

(73) Assignee: Hoya Robot Co., Ltd., Daegu (KR)

( * ) Notice: Subject to any disclaimer, the term of this patent is extended or adjusted under 35 U.S.C. 154(b) by 0 days.

(21) Appl. No.: 13/057,129

(22) PCT Filed: Jul. 29, 2009

(86) PCT No.: PCT/KR2009/004214
§ 371 (c)(1),
(2), (4) Date: Feb. 1, 2011

(87) PCT Pub. No.: WO2010/013935
PCT Pub. Date: Feb. 4, 2010

(65) Prior Publication Data
US 2011/0132671 A1    Jun. 9, 2011

(30) Foreign Application Priority Data
Aug. 1, 2008  (KR) .................. 10-2008-0075647

(51) Int. Cl.
    *B60R 21/00* (2006.01)
(52) U.S. Cl. ......................... 280/755; 180/8.3
(58) Field of Classification Search .......... 180/8.1, 180/8.2, 8.3, 218, 7.1, 21; 280/250.1, 755, 280/DIG. 10
See application file for complete search history.

(56) References Cited

U.S. PATENT DOCUMENTS

| | | | |
|---|---|---|---|
| 4,550,924 A * | 11/1985 | Alber | 280/5.28 |
| 6,548,982 B1 * | 4/2003 | Papanikolopoulos et al. | 318/568.11 |
| 7,481,291 B2 * | 1/2009 | Nishikawa | 180/218 |
| 7,673,710 B2 * | 3/2010 | Lee et al. | 180/8.2 |
| 8,061,460 B2 * | 11/2011 | Scheck | 180/8.1 |
| 2001/0018992 A1 * | 9/2001 | Alber | 180/8.2 |
| 2002/0104692 A1 * | 8/2002 | Nakatsukasa et al. | 180/8.3 |
| 2006/0149419 A1 * | 7/2006 | Ogawa et al. | 700/245 |
| 2008/0173493 A1 * | 7/2008 | Adachi | 180/218 |
| 2008/0251300 A1 * | 10/2008 | Frankie | 180/8.2 |
| 2010/0243357 A1 * | 9/2010 | Yim et al. | 180/218 |

* cited by examiner

*Primary Examiner* — Tashiana Adams
(74) *Attorney, Agent, or Firm* — Lewis and Roca LLP

(57) ABSTRACT

Provided is a small mobile robot which moves back and forth and left and right while keeping its posture by two main wheels. The small mobile robot includes built-in auxiliary wheels to overcome topographical elevation differences. The auxiliary wheels of the small mobile robot are attached to a servomotor. The servomotor is driven by remote control, and the auxiliary wheel can be moved to the position required for operation. When the robot is in a normal state, the auxiliary wheels are retracted in the robot. When the robot meets a stepped topography, the auxiliary wheels are lowered out to contact a ground to support the main wheels going over the stepped topography. The small mobile robot includes a sensor for sensing obstacles and a control module to make a detour around obstacles while moving to a target point.

12 Claims, 6 Drawing Sheets

【Figure 1】
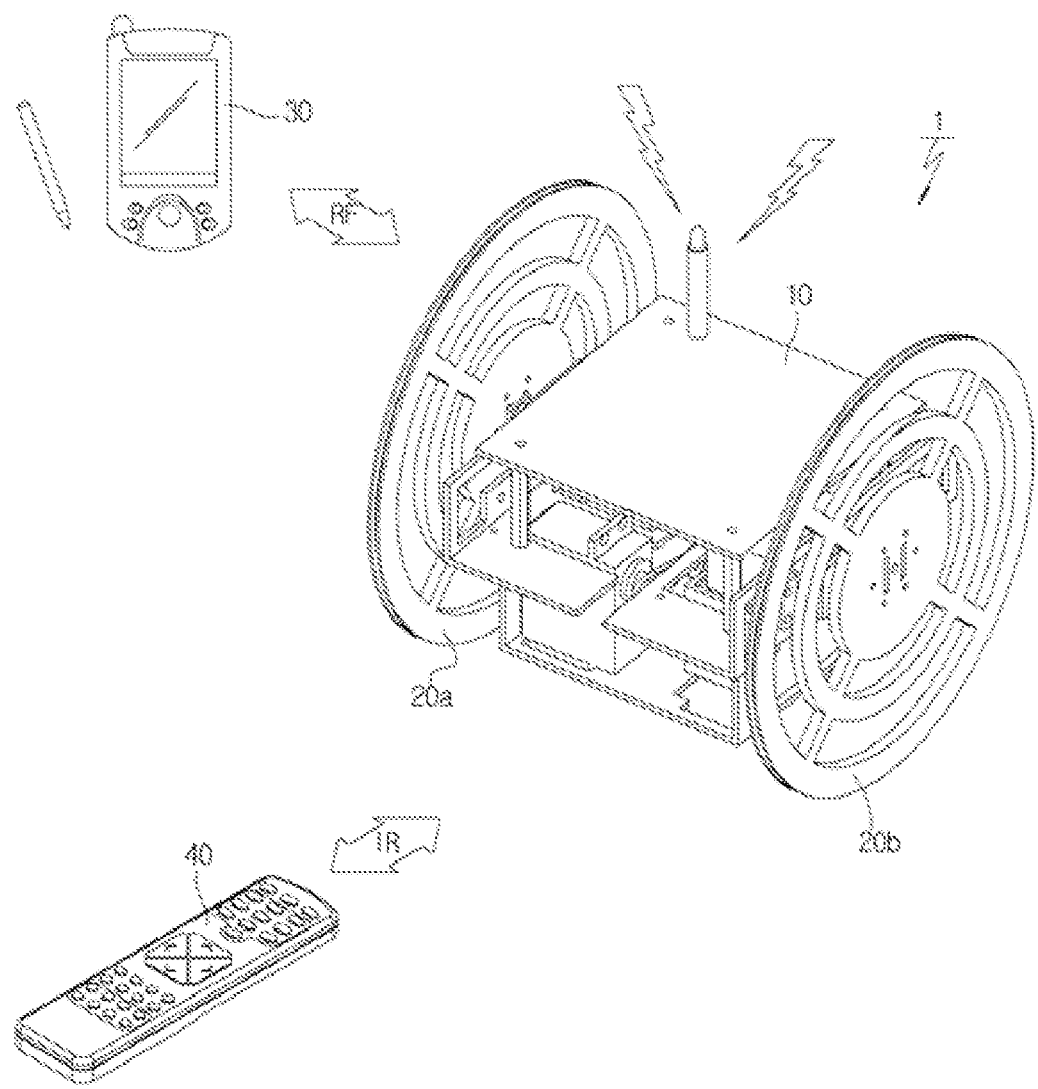

[Figure 2]
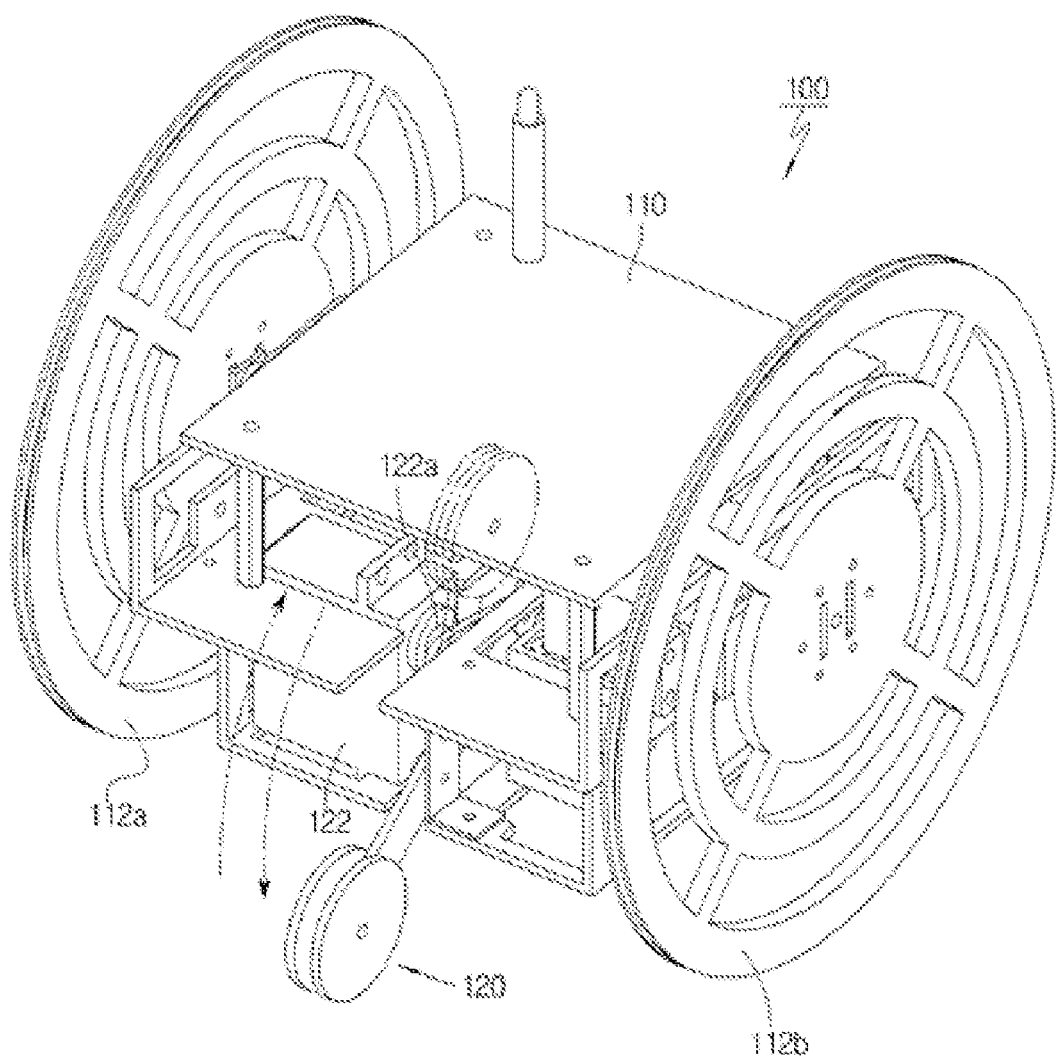

【Figure 3】
(a)
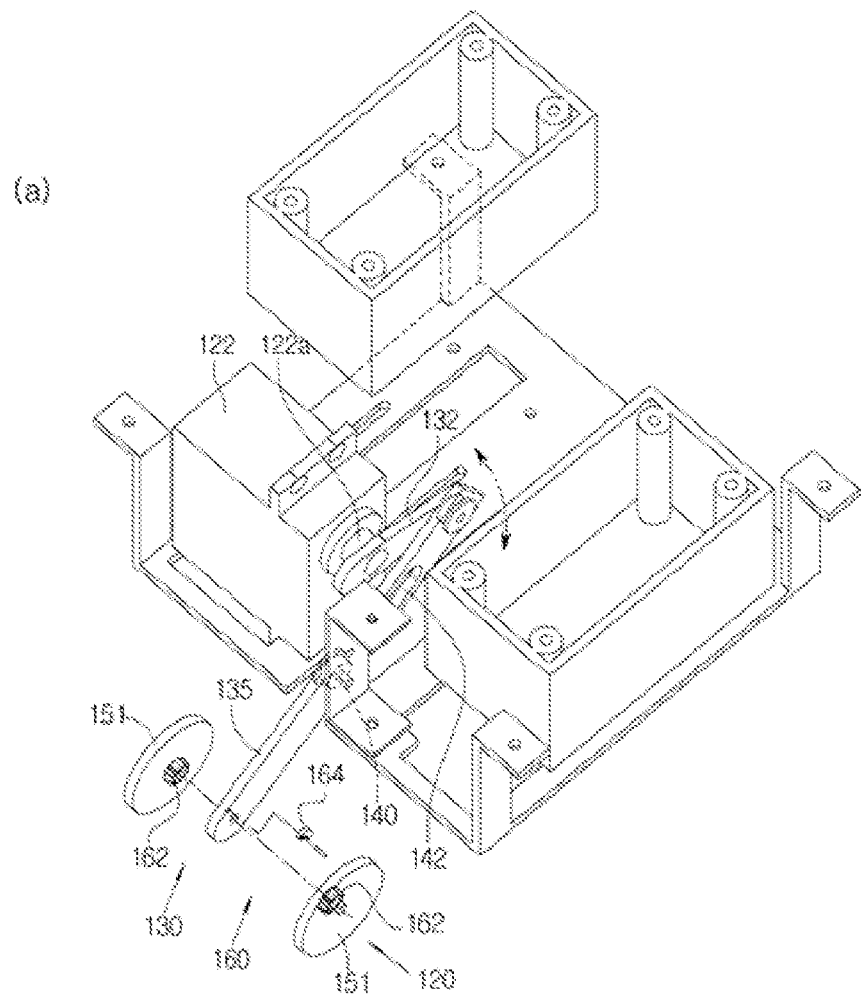
(b)
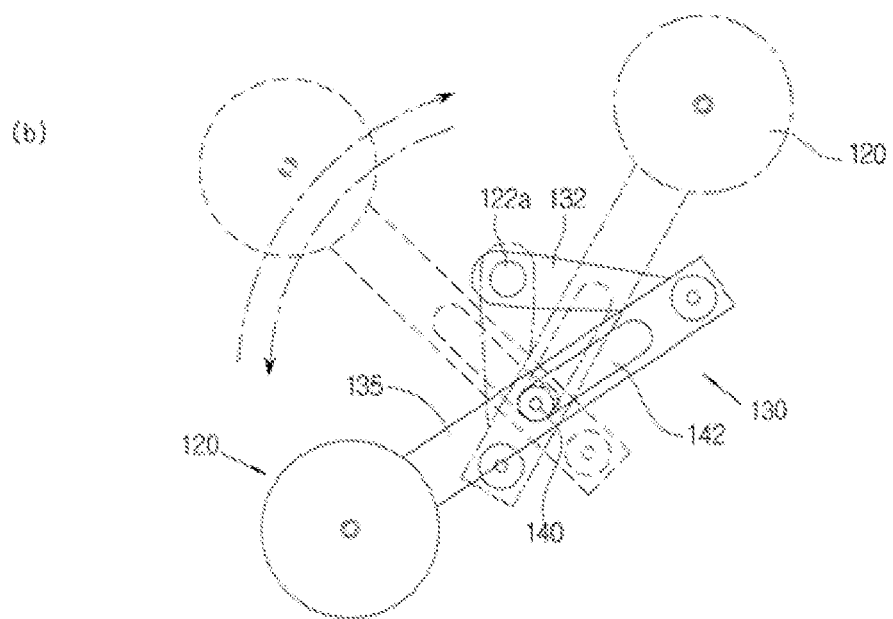

【Figure 4】
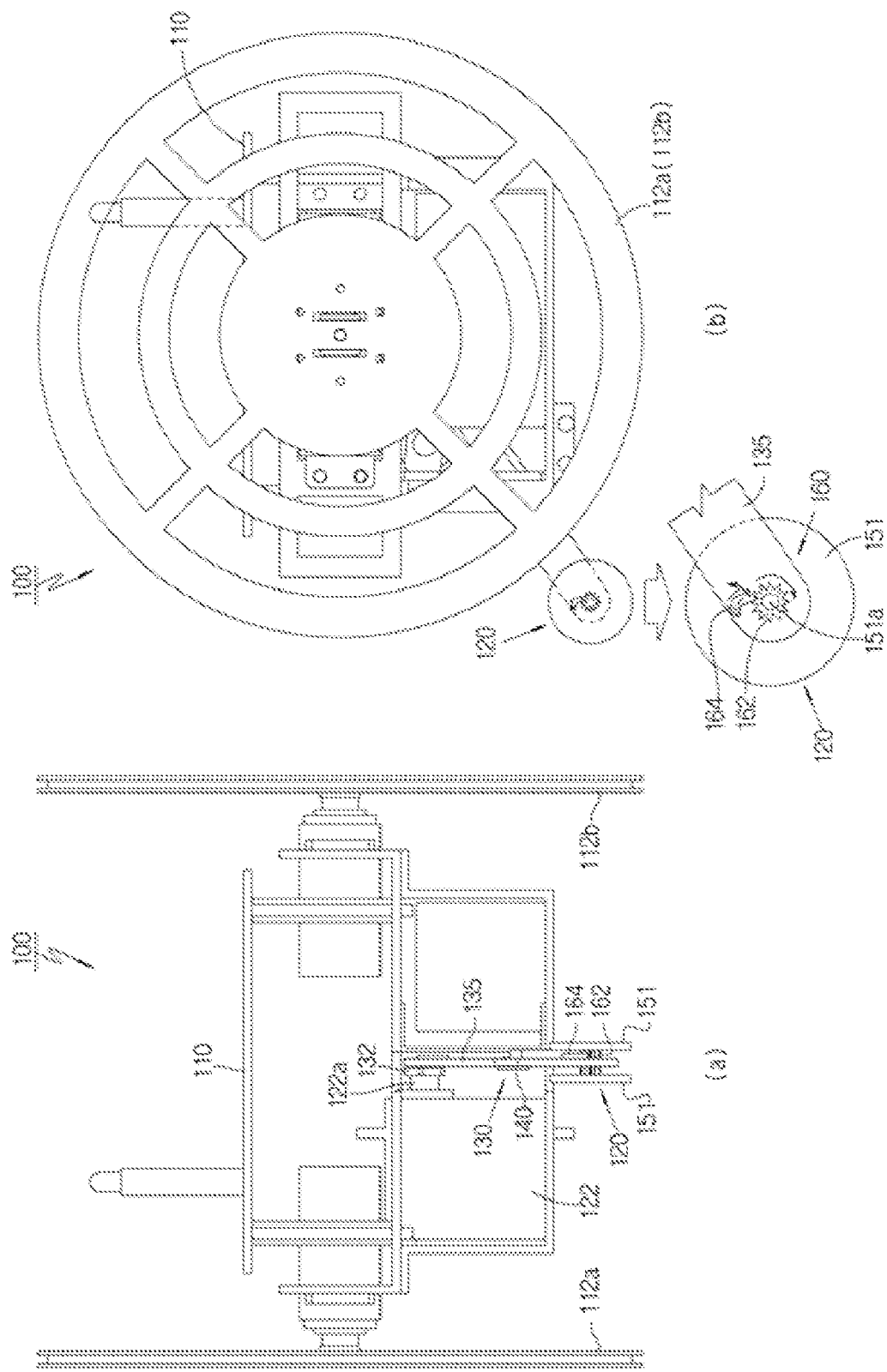

【Figure 5】
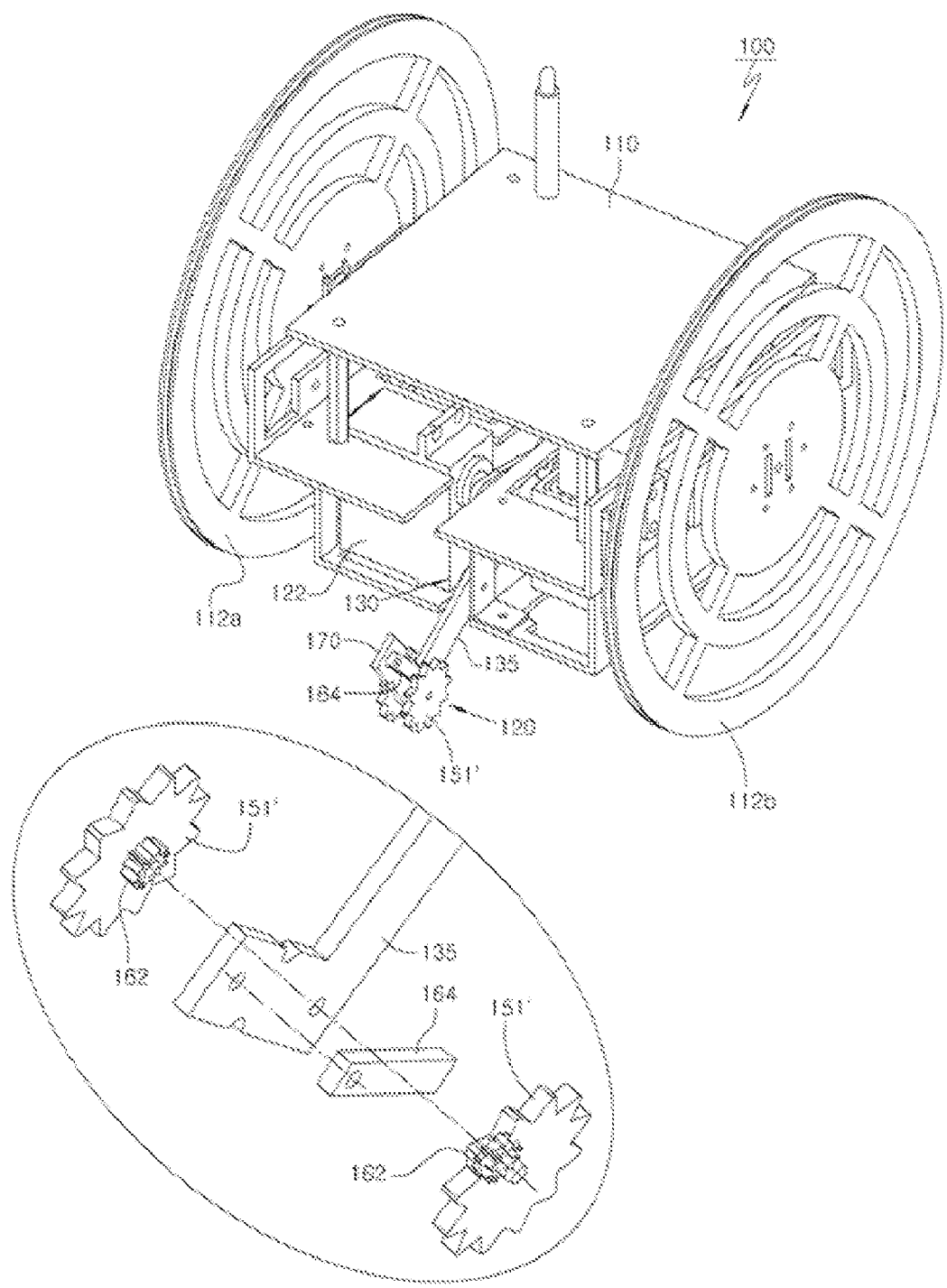

[Figure 6]
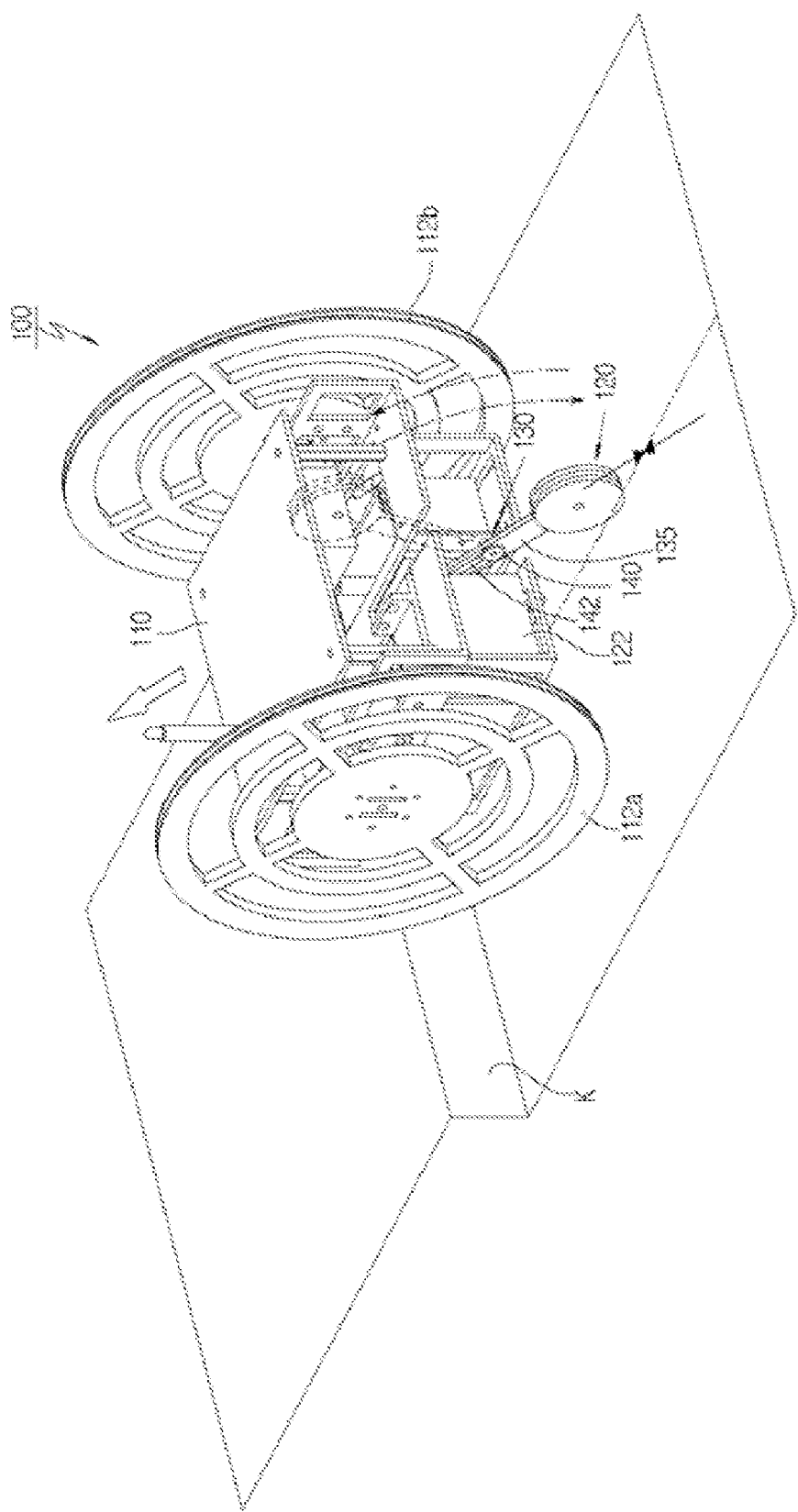

SMALL MOBILE ROBOT WITH BUILT-IN AUXILIARY WHEEL FOR OVERCOMING TOPOGRAPHY

TECHNICAL FIELD

The present disclosure relates to an improved small mobile robot that provides various high-quality services and functions as a bottom device for ubiquitous sensor networks (USNs) or ubiquitous robotic companions (URCs), and more particularly, to a small mobile robot including built-in auxiliary wheels that rotate only in a travelling direction without rotating in a reverse direction to easily go over a stepped topography, in which the auxiliary wheels are retracted in a main body in a normal state and are lowered out to contact a ground to function as a support when meeting a stepped topography, so as to overcome a topography.

BACKGROUND ART

Recently, as robot industries are rapidly grown and research thereon is supported all over the world, intelligent robots for services, industries and special purposes are being actively developed. In addition, intensive research is being carried out on functions and motions of robots to provide various high-quality services. Especially, sensing systems, communication and network technologies, various motions, and functions for overcoming obstacles and extreme topographies are added to exploring, observing, and guarding robots to perform their functions at intended positions, thereby functioning as high performance robots that obtain reliable information and expand their fields.

Typically, two-wheel mobile robots have simpler motion mechanisms, higher speed, and are more economical than biped robots and moving robots having special shapes, but the two-wheel mobile robots have limitations in movements on special topographies. Thus, research is carried out on biped robots that have excellent mobility on special topographies, multi-wheel robots, and robots including driving devices having special shapes. However, two-wheel mobile robots or two-wheel service robots can be manufactured at lower costs than typical humanoid robots and various mobile robots, and furthermore, have excellent mobility for simple mechanisms.

A two-wheel mobile robot 1 as described above is illustrated in FIG. 1. Unlike a typical USN sensor node, the two-wheel mobile robot 1 is a movable small intelligent robot that can communicate while on a move, and transmit various types of information at an intended position in real time. The two-wheel mobile robot 1 includes wheels 20a and 20b at both sides of a main body 10, and uses a wireless communication between the small mobile robot 100 and a personal digital assistant (PDA) 30 using Bluetooth, to check and adjust movements (such as forward and rearward movements and a rotation)/stop of the two-wheel mobile robot 1, and monitoring of camera image information, on a control window of a screen of the PDA 30. Furthermore, a speed of a direct current (DC) motor can be adjusted to control a movement speed of the two-wheel mobile robot 1 and sense information from various sensors. In addition, when the two-wheel mobile robot 1 includes a remote controller 40 that has buttons for movements (such as forward and rearward movements and a rotation)/stop of the two-wheel mobile robot 1 and a button for adjusting a speed of the two-wheel mobile robot 1, the two-wheel mobile robot 1 can move within a narrow space and make an easy detour around an obstacle.

A typical USN system requires a number of sensor node systems to obtain accurate and stable environmental information in a wide region. However, the two-wheel mobile robot 1 can communicate with another robot and move to expand an environmental region to be sensed, and can maximally approach an intended position to accurately measure a target value to be sensed.

The two-wheel mobile robot 1 uses a gyro sensor, an acceleration sensor, and an encoder to sense torque generated by an inclination and inertia, and constitutes a feedback compensation circuit to maintain and balance a posture, thereby efficiently moving a system and controlling motions. The two-wheel mobile robot 1 further includes a sensor for sensing an obstacle and an object to sense front and rear conditions in real time and provide information for a detour.

In addition, the two-wheel mobile robot 1 includes an integral module for an image and a communication to miniaturize a system, and the integral module communicates with another robot and a server, and further, can transmit and receive position information while the two-wheel mobile robot 1 moves. However, when the two-wheel mobile robot 1 having high performances as described above meets a distinctive topography, particularly, a stepped topography such as a threshold while moving to a sensed target point, the wheels 20a and 20b may be pushed back by the stepped topography without going over it. Thus, since the two-wheel mobile robot 1 is pushed back without overcoming the stepped topography, the two-wheel mobile robot 1 may not arrive at the target point.

DISCLOSURE

Technical Problem

Embodiments provide an improved small mobile intelligent robot including built-in auxiliary wheels, which can efficiently overcome a stepped topography and be applied to USN and URC industries, thereby providing reverse engineering services, high quality private services, high performance industrial services, and a basic technology for researching intelligent robots.

Embodiments also provide a high performance small mobile robot including built-in auxiliary wheels to efficiently move on a narrow topography and overcome a distinctive topography, in which the auxiliary wheels are retracted in a normal state and are lowered out when meeting a stepped topography to overcome the stepped topography.

Technical Solution

In one embodiment, a small two-wheel mobile robot configured to communicate while on a move and transmit various types of information at an intended position in real time includes: a main body including two main wheels at both sides thereof; a servomotor installed on the main body and including a rotation shaft configured to rotate forward and backward; an auxiliary wheel connected to the rotation shaft of the servomotor through a linkage part; and a one-way rotation member attached to the auxiliary wheel to allow the auxiliary wheel to rotate only in a forward direction and prevent the auxiliary wheel from rotating in a reverse direction, wherein the auxiliary wheel is retracted in the main body in a normal state, and is lowered out to contact a ground when meeting a stepped topography such that the auxiliary wheel functions as a support in the reverse direction and functions as a rotation auxiliary wheel in the forward direction to go over a stepped part.

The linkage part may include: a first linkage having an end connected to the rotation shaft of the servomotor; and a second linkage having an end rotatably connected to the other end of the first linkage, and the other end on which the auxiliary wheel is rotatably installed, wherein the second linkage is rotatably connected to a hinge shaft of the main body.

The second linkage may have an elongated hole in a middle portion thereof, and be connected to the hinge shaft through the elongated hole, and the hinge shaft may move along the elongated hole.

When the servomotor rotates in a first direction, the linkage part may rotate the auxiliary wheel upward to an upper space of the main body such that the auxiliary wheel is disposed in the main body. When the servomotor rotates in a second direction that is opposite to the first direction, the linkage part may rotate the auxiliary wheel downward from the upper space of the main body such that the auxiliary wheel is in close contact with a ground.

The auxiliary wheel may include a wheel rotatably installed on an end of the linkage part, and the one-way rotation member may be installed on a side surface of the wheel.

The auxiliary wheel may include a plurality of wheels rotatably installed on an end of the linkage part, and the one-way rotation member may be installed on a side surface of the wheel.

The one-way rotation member may include: a toothed member fixed to a side surface of the wheel; and a braking bar having an end that is caught to the toothed member, wherein the end that is caught to the toothed member is disposed at a front side of a center axis of the wheel to allow the auxiliary wheel to rotate forward and prevent the auxiliary wheel from rotating rearward.

The one-way rotation member may include a protrusion part at an upper side of an end of the linkage part, and the braking bar may be rotatable, and the protrusion part may protrude out of the wheel.

A circumferential surface of the wheel may be provided with a toothed rough surface.

The details of one or more embodiments are set forth in the accompanying drawings and the description below. Other features will be apparent from the description and drawings, and from the claims.

Advantageous Effects

According to embodiments, the following effects can be attained.

Unlike a related art mobile robot that has a complicated structure or includes auxiliary devices to overcome a stepped topography, the auxiliary wheels according to the embodiment are retracted in the main body in a normal state, and the auxiliary wheels are lowered out when meeting the stepped topography, to overcome the stepped topography. Thus, according to the embodiment, the small mobile robot includes the auxiliary wheels in a simple structure to make an efficient move with a small variation even on the stepped topography, and thus, the small mobile robot can be manufactured in a small structure and is remarkably economical.

In addition, according to the embodiment, the auxiliary wheels may have one of various shapes including a toothed shape, according to a topography, and thus, the small mobile robot can move on various topographies.

According to the embodiment, the small mobile robot can efficiently move on a stepped topography and a distinctive topography, and can provide environmental information and obstacle information through a communication while moving to a target point, and thus, can be variously applied to a mobile robot field.

Thus, according to the embodiment, the small mobile robot is a high performance small mobile robot including the auxiliary wheels to address limitations of related art two-wheel intelligent mobile robots and efficiently overcome the stepped topography.

DESCRIPTION OF DRAWINGS

FIG. 1 is a perspective view illustrating an entire structure of a small two-wheel mobile robot in a related art.

FIG. 2 is a perspective view illustrating a small mobile robot including built-in auxiliary wheels for overcoming a topography, according to an embodiment.

FIG. 3A is an exploded perspective view illustrating a small mobile robot including a main body and built-in auxiliary wheels for overcoming a topography, according to an embodiment.

FIG. 3B is a schematic view illustrating an operation of a linkage part of a small mobile robot including built-in auxiliary wheels for overcoming a topography, according to an embodiment.

FIG. 4A is a rear view illustrating a small mobile robot including built-in auxiliary wheels for overcoming a topography, according to an embodiment.

FIG. 4B is a side view illustrating a small mobile robot including built-in auxiliary wheels for overcoming a topography, according to an embodiment.

FIG. 5 is a perspective view illustrating toothed wheels of a small mobile robot including built-in auxiliary wheels for overcoming a topography, according to an embodiment.

FIG. 6 is a perspective view illustrating a process in which a small mobile robot including built-in auxiliary wheels for overcoming a topography goes over a stepped topography, according to an embodiment.

MODE FOR INVENTION

Reference will now be made in detail to the embodiments of the present disclosure, examples of which are illustrated in the accompanying drawings.

Referring to FIG. 2, a small mobile robot 100 according to an embodiment includes auxiliary wheels 120 to easily overcome a stepped topography. First, basic operations of the small mobile robot 100 will now be described.

The small mobile robot 100 is a system that moves with various sensors and an image device installed on a robot platform to sense environmental information at an intended position and to transmit the environmental information through a wireless communication. The small mobile robot 100 includes a main body 110, main wheels 112a and 112b on a main body 110, and the auxiliary wheels 120 at the rear side thereof to overcome a stepped topography.

The auxiliary wheels 120 are connected to a rotation shaft 122a of a servomotor 122 disposed in the rear portion of the main body 110, and are lowered out when meeting a stepped topography, to contact a ground and function as a support. The auxiliary wheels 120 rotate only in a traveling direction without rotating in the reverse direction thereto. The auxiliary wheels 120 are installed on a rear surface of the main body 110, and are driven by the servomotor 122 installed on the main body 110. The rotation shaft 122a of the servomotor 122 can rotate forward and backward, and is connected to the auxiliary wheels 120 through a linkage part 130.

Referring to FIGS. 3A and 3B, the linkage part 130 includes a first linkage 132 having an end connected to the rotation shaft 122a of the servomotor 122, and a second linkage 135 having an end rotatably connected to the other end of the first linkage 132 and the other end on which the auxiliary wheel 120 is rotatably installed. The second linkage 135 is longer than the first linkage 132, and is rotatably connected to a hinge shaft 140 of the main body 110. Accordingly, when the rotation shaft 122a of the servomotor 122 rotates in a first direction, for example, rotates forward, the linkage part 130 rotates the first linkage 132 and rotates the auxiliary wheels 120 with the second linkage 135 upward to the upper space of the main body 110 such that the auxiliary wheels 120 are disposed in the main body 110 as depicted with dotted line in FIG. 2.

When the rotation shaft 122a of the servomotor 122 rotates in a second direction that is reverse to the first direction, for example, rotates backward, the linkage part 130 reversely rotates the first linkage 132, and rotates the auxiliary wheels 120 with the second linkage 135 downward from the upper space of the main body 110 such that the auxiliary wheels 120 are in close contact with a ground, as depicted with solid line in FIG. 2.

The second linkage 135 has an elongated hole 142 in the middle portion thereof such that the second linkage 135 is connected to the hinge shaft 140. In this case, the hinge shaft 140 can move along the elongated hole 142. This structure is illustrated in FIG. 3B. According to this structure, an operation of the servomotor 122 can rotate the second linkage 135 although the hinge shaft 140 and the rotation shaft 122a of the servomotor 122 are disposed on different axes. That is, the hinge shaft 140 is disposed at a close side of the elongated hole 142 to the auxiliary wheels 120 at the positions depicted with solid line in FIGS. 2 and 3B where the auxiliary wheel 120 is placed on the ground by the servomotor 122, and the hinge shaft 140 is disposed at a distant side of the elongated hole 142 from the auxiliary wheels 120 at the positions depicted with dotted line in FIGS. 2 and 3B where the auxiliary wheels 120 are retracted in the main body 110 by the servomotor 122.

The auxiliary wheels 120 of the small mobile robot 100 includes wheels 151 that are rotatably installed on an end of the linkage part 130. A one-way rotation member 160 is installed on a side surface of the wheel 151. In this case, the wheel 151 may have a circular plate structure, and the wheel 151 may be provided in plurality as illustrated in FIGS. 2, 4A, and 4B.

The one-way rotation member 160 allows the auxiliary wheels 120 to rotate only in the travelling direction, that is, only in a forward direction of the main body 110, and prevents the auxiliary wheels 120 from rotating in a reverse direction, that is, a backward direction of the main body 110. Accordingly, when the auxiliary wheels 120 are lowered to contact the ground, the auxiliary wheels 120 function as a support in the reverse direction, and function as a rotation auxiliary wheel in the forward direction. Referring to FIG. 4B, the one-way rotation member 160 includes a toothed member 162 fixed to the side surface of the wheel 151, and a braking bar 164 having an end that is caught to the toothed member 162.

The end of the braking bar 164, which is caught to the toothed member 162, is disposed at the front side of a center axis of the wheels 151 to allow the auxiliary wheels 120 to rotate forward and prevent the auxiliary wheel 120 from rotating backward.

According to an embodiment, referring to FIG. 5, the one-way rotation member 160 may include a protrusion part 170 at the upper side of an end of the linkage part 130, and the braking bar 164 can be rotated. In this case, the protrusion part 170 protrudes out of wheels 151. For example, the wheels 151 constituting the auxiliary wheels 120 may have a small diameter, and the circumferential surfaces thereof may be provided with toothed rough surfaces. As such, the toothed rough surfaces increase a frictional surface with a rough topography or a normal topography to further suppress a push back than the above-described wheel 151.

According to the embodiment, the servomotor 122 is connected to a main micro controller (not shown), so that the servomotor 122 can be remotely controlled at the exterior of the small mobile robot 100. In addition, the auxiliary wheels 120 are lowered to a ground by a remote control only when the auxiliary wheels 120 are necessary, that is, when the small mobile robot 100 meets a stepped topography, and the auxiliary wheels 120 are retracted in a normal state.

Referring to FIG. 6, the small mobile robot 100 configured as described above uses the main wheels 112a and 112b disposed on the main body 110 to arrive at a target point. In this case, a user uses a wireless communication between the small mobile robot 100 and a PDA using Bluetooth as in the related art, to check and adjust movements (such as forward and rearward movements and a rotation)/stop of the small mobile robot 100, and monitoring of camera image information, on a control window of a screen of the PDA. Furthermore, the user can adjust a speed of a DC motor to adjust a movement speed of the small mobile robot 100 and sense information from various sensors.

In addition, when the small mobile robot 100 includes a remote controller that has buttons for movements (such as forward and rearward movements and a rotation)/stop of the small mobile robot 100 and a button for adjusting a speed of the small mobile robot 100, the small mobile robot 100 can move within a narrow space and make an easy detour around an obstacle.

When the small mobile robot 100 meets a stepped topography K, the auxiliary wheels 120 are lowered and contact a ground to function as a support in the reverse direction and function as a rotation auxiliary wheel in the forward direction, thereby overcoming the stepped topography K.

In this case, a user can easily check the stepped topography K on the PDA through a built-in camera in the main body 110. That is, when the user senses the stepped topography K in advance in the travelling direction on a camera image, the auxiliary wheels 120 are lowered out. To this end, when the small mobile robot 100 is moved backward with the auxiliary wheels 120 retracted in the main body 110, the small mobile robot 100 is slightly inclined forward as a whole. In this case, since the camera is directed to a slightly lower side, the user can efficiently sense the stepped topography K to remotely operate the servomotor 122 through the PDA or the remote controller such that the auxiliary wheels 120 are lowered to the ground. Furthermore, the user may use the remote controller to arbitrarily lower the auxiliary wheels 120.

Alternatively, when the stepped topography K is sensed through the camera, the servomotor 122 may be operated such that the auxiliary wheels 120, disposed in the rear end of the main body 110 are lowered in advance to a rear side of the ground, and then, the small mobile robot 100 approaches the stepped topography K in the state where the auxiliary wheels 120 are lowered out. At this point, the auxiliary wheels 120 designed to rotate only in the travelling direction by the one-way rotation member 160 function as a support at the rear side when the main wheels 112a and 112b are pushed back by the stepped topography K. That is, when the main wheels 112a and 112b maximally approach a vertical stepped surface of the stepped topography K, the auxiliary wheels 120 finally function as a support resisting reaction force that pushes the main wheels 112a and 112b back, and thus, the main wheels 112a and 112b go over the vertical stepped surface.

When the main wheels 112a and 112b are pushed back against a stepped topography, the braking bar 164 of the one-way rotation member 160 is caught to the toothed member 162 to prevent the auxiliary wheels 120 from rotating reversely. Thus, the main body 110 closely contacts the stepped topography without a push back, and then, goes over the stepped topography by the rotation of the main wheels 112a and 112b.

At this point, force from the main wheels 112a and 112b in the travelling direction generates reaction force in the opposite direction, thereby forming a force relationship at contacts between the auxiliary wheels 120 and the ground. That is, the force applied from the auxiliary wheels 120 to the ground generates the reaction force in the opposite direction, and the reaction force is applied in the travelling direction of the main body 110, and thus, functions as driving force. Thus, the auxiliary wheels 120 are disposed at the rear side of the small mobile robot 100 to push the small mobile robot 100, and provide force required for overcoming a stepped topography.

Unlike a related art mobile robot that has a complicated structure or includes auxiliary devices to overcome a stepped topography, the auxiliary wheels 120 according to the embodiment are retracted in the main body 110 in a normal state, and the auxiliary wheels 120 are lowered out when meeting the stepped topography K, to overcome the stepped topography K. Thus, according to the embodiment, the small mobile robot 100 includes the auxiliary wheels 120 in a simple structure to make an efficient move with a small variation even on the stepped topography K, and thus, the small mobile robot 100 can be manufactured in a small structure and is remarkably economical.

In addition, according to the embodiment, the auxiliary wheels 120 may have one of various shapes including a toothed shape, according to a topography, and thus, the small mobile robot 100 can move on various topographies.

According to the embodiment, the small mobile robot 100 can efficiently move on a stepped topography and a distinctive topography, and can provide environmental information and obstacle information through a communication while moving to a target point, and thus, can be variously applied to a mobile robot field. In addition, according to the embodiment, the small mobile robot 100 is a high performance small mobile robot including the auxiliary wheels 120 to address limitations of related art two-wheel intelligent mobile robots and efficiently overcome the stepped topography K.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. For example, a lining layer having high coefficient of friction may be attached to a wheel of an auxiliary wheel to prevent a slip, or a rough surface such as knurling may be provided thereto, or a plurality of wheels may be combined.

What is claimed is:

1. A mobile robot that communicates while in motion and transmits various types of information at an intended position in real time, the mobile robot comprising:
    a main body including two main wheels at both sides thereof;
    a servomotor installed on the main body and including a rotation shaft that rotates forward and backward;
    an auxiliary wheel connected to the rotation shaft of the servomotor through a linkage part; and
    a one-way rotation member attached to the auxiliary wheel to allow the auxiliary wheel to rotate only in a forward direction and prevent the auxiliary wheel from rotating in a reverse direction, and wherein the auxiliary wheel is retracted in the main body in a normal state, and is lowered out to contact a ground when meeting a stepped topography such that the auxiliary wheel functions as a support in the reverse direction and functions as a rotation auxiliary wheel in the forward direction to go over a stepped part.

2. The mobile robot of claim 1, wherein the linkage part includes:
    a first linkage having an end connected to the rotation shaft of the servomotor; and
    a second linkage having an end rotatably connected to the other end of the first linkage, and the other end on which the auxiliary wheel is rotatably installed, and wherein the second linkage is rotatably connected to a hinge shaft of the main body.

3. The mobile robot of claim 2, wherein the second linkage has an elongated hole in a middle portion thereof, and is connected to the hinge shaft through the elongated hole, and the hinge shaft moves along the elongated hole.

4. The mobile robot of claim 2, wherein the linkage part rotates the auxiliary wheel upward to an upper space of the main body such that the auxiliary wheel is disposed in the main body when the servomotor rotates in a first direction, and the linkage part rotates the auxiliary wheel downward from the upper space of the main body such that the auxiliary wheel is in close contact with a ground when the servomotor rotates in a second direction that is opposite to the first direction.

5. The mobile robot of claim 1, wherein the auxiliary wheel includes a wheel rotatably installed on an end of the linkage part, and the one-way rotation member is installed on a side surface of the wheel.

6. The mobile robot of claim 1, wherein the auxiliary wheel includes a plurality of wheels rotatably installed on an end of the linkage part, and the one-way rotation member is installed on a side surface of the wheel.

7. The mobile robot of claim 5, wherein the one-way rotation member includes:
    a toothed member fixed to a side surface of the wheel; and
    a braking bar having an end that is caught to the toothed member, and wherein the end that is caught to the toothed member is disposed at a front side of a center axis of the wheel to allow the auxiliary wheel to rotate forward and prevent the auxiliary wheel from rotating rearward.

8. The mobile robot of claim 6, wherein the one-way rotation member includes:
    a toothed member fixed to a side surface of the wheel; and
    a braking bar having an end that is caught to the toothed member, and wherein the end that is caught to the toothed member is disposed at a front side of a center axis of the wheel to allow the auxiliary wheel to rotate forward and prevent the auxiliary wheel from rotating rearward.

9. The mobile robot of claim 7, wherein the one-way rotation member includes a protrusion part at an upper side of an end of the linkage part, and the braking bar is rotatable, and the protrusion part protrudes out of the wheel.

10. The mobile robot of claim 8, wherein the one-way rotation member includes a protrusion part at an upper side of an end of the linkage part, and the braking bar is rotatable, and the protrusion part protrudes out of the wheel.

11. The mobile robot of claim 9, wherein a circumferential surface of the wheel is provided with a toothed rough surface.

12. The mobile robot of claim 10, wherein a circumferential surface of the wheel is provided with a toothed rough surface.

* * * * *